United States Patent [19]

Knodle et al.

[11] Patent Number: 5,602,398

[45] Date of Patent: Feb. 11, 1997

[54] NONDISPERSIVE INFRARED RADIATION SOURCE

[75] Inventors: Daniel W. Knodle, Seattle; Thomas R. Clary, Issaquah, both of Wash.

[73] Assignee: Pryon Corporation, Menomonee Falls, Wis.

[21] Appl. No.: 577,719

[22] Filed: Dec. 22, 1995

[51] Int. Cl.$^6$ ....................................................... H05B 3/26
[52] U.S. Cl. ..................... 250/504 R; 250/493.1; 250/495.1
[58] Field of Search ........................... 250/504 R, 493.1, 250/494.1, 495.1; 219/538, 552, 553; 273/348.1

[56] References Cited

U.S. PATENT DOCUMENTS

| | | | |
|---|---|---|---|
| 3,694,624 | 9/1972 | Buchta | 219/358 |
| 4,378,489 | 3/1983 | Chabinsky et al. | 219/543 |
| 4,644,141 | 2/1987 | Hagen et al. | 219/543 |
| 4,859,858 | 8/1989 | Knodle et al. | 250/504 R |
| 4,859,859 | 8/1989 | Knodle et al. | 250/504 R |
| 5,324,951 | 6/1994 | Kocache et al. | 250/504 R |
| 5,369,277 | 11/1994 | Knodle et al. | 250/343 |
| 5,401,966 | 3/1995 | Gray et al. | 250/343 |

Primary Examiner—Jack I. Berman
Assistant Examiner—Kiet T. Nguyen
Attorney, Agent, or Firm—Donald J. Ersler

[57] ABSTRACT

A nondispersive infrared radiation source includes a base, a plurality of formed pins, a thick film resistor and an o-ring, the base has the shape of a cylinder and a plurality of grooves formed therein. A bore is formed in the base which is terminated by a bottom surface defined by a spherical radius. A reflective coating is applied upon the bottom surface. The plurality of formed pins are heat staked into the plurality of grooves and the o-ring is placed in one of the grooves. The thick film resistor comprises a substrate, a dielectric glass layer and a conductor layer, the substrate has a plurality of thick film resistors which are formed thereon. The plurality of thick film resistors are separated by use of a quadrapole laser. The thick film resistor is electrically connected to the plurality of pins with a solder connection. A DC source is electrically connected to the plurality of formed pins, and infrared light radiates from the resistive pad striking the reflective surface in the base, and the infrared light emits from the second end of the base.

18 Claims, 7 Drawing Sheets

NONDISPERSIVE INFRARED RADIATION SOURCE

BACKGROUND OF THE INVENTION

1. Field of the Invention

The present invention relates generally to nondispersive infrared radiation sources and more specifically to a nondispersive infrared radiation source utilized in gas analyzing equipment which is more easily manufactured than the prior art.

2. Discussion of the Prior Art

Gas analyzers are used in the analysis of a medical patient's exhalation gases. The gas analyzer utilizes a radiating light source which is filtered down to a narrow wavelength. The narrow wavelength of light is then passed through a translucent tube containing the medical patient's exhalation gases. The narrow wavelength of light is absorbed by a specific gas. A detector opposite the radiating light source measures the attenuation in frequency of the narrow wavelength of light, after it passes through the specific gas in the translucent tube. The amplitude of the narrow wavelength of light and the attenuated value are calculated by an algorithm to determine the amount of specific gas in the translucent tube.

The prior art in the past has utilized incandescent light bulbs as a radiation source, but more recently, infrared light generated from a thick film resistor has been utilized as a radiation source. Significant prior art in the area of infrared light sources is found in U.S. Pat. No. 5,369,277. The infrared light source in this invention contains many parts which are difficult to make and assemble.

The thick film resistor utilized in the '277 patent is also prone to failure due to the manufacturing process. The thick film resistor is cut from a plate using a laser process that drills tiny holes in the edges of the thick film resistors. The individual thick film resistors are then separated by breaking them off the plate. The resulting breaking leaves micro cracks in the substrate of the thick film resistors which can later lead to premature failures.

Accordingly, there is a clearly felt need in the art for a nondispersive infrared radiation source which is simpler in design, more easily manufactured, and is more reliable than the prior art devices.

SUMMARY OF THE INVENTION

The primary objective of the present invention is to provide a nondispersive infrared radiation source which uses as few parts as possible and allows these parts to be easily assembled with increased reliability.

According to the present invention, a nondispersive infrared radiation source includes a base, a plurality of formed pins, a thick film resistor and an o-ring. The base having a first end, a second end and a predetermined length. A first pin groove and a second pin groove are formed in the predetermined length of the base and a first pin slot and a second pin slot traverse the first and second ends of the base, respectively. A cylinder defines the shape of the base. An o-ring groove is formed in the circumference of the base at substantially the first end. A bore is formed at substantially the second end of the base which is terminated by a bottom surface having a spherical radius. A reflective coating is applied to the bottom surface of the bore. A shallow bore is formed at substantially the first end of the base.

The plurality of formed pins have a first end, second end and a predetermined length. The predetermined length of each formed pin is heat staked into the first and second pin grooves in the base. The o-ring is placed in the o-ring groove in the base.

The thick film resistor includes a substrate, a dielectric glass layer and a conductor layer. A thick film layer of dielectric glass is applied to the substrate. A conductor layer is thick film applied to the dielectric glass layer. The opposing end of each conductor is terminated by a solder pad which is thick film applied to the conductor layer. A resistive pad is applied to the conductor layer in substantially the center of the thick film resistor. The resistive pad, the conductor layer and the plurality of solder pads are all electrically conductive to each other.

The substrate has a plurality of thick film resistors which are formed thereupon. The plurality of thick film resistors are separated by the use of a quadrapole laser. The laser beam emitting from the quadrapole laser, is moved along the perimeter of each thick film resistor. The laser beam separates the thick film resistor from the substrate by vaporizing a small area surrounding each thick film resistor.

The thick film resistor is electrically connected to the plurality of pins with a solder connection. The soldering process is performed by the application of solder paste to the second end of each formed pin. The solder pads of the thick film resistor are placed on the plurality formed pins. A tip of a heated soldering iron is applied to the first end of each formed pin. Heat conducted by the pin melts the solder paste which solders the formed pins to the solder pads of the thick film resistor.

To obtain nondispersive infrared radiation from the present invention, a DC source is electrically connected to the formed pins. Infrared light radiates from the resistive pad when the DC source is applied to the formed pins. The infrared light is then deflected from the reflective surface of the base toward a target area.

Accordingly, it is an object of the present invention to provide a nondispersive infrared radiation source which has less parts than those of the prior art.

It is a further object of the present invention to provide a nondispersive infrared radiation source which is easily assembled and manufactured than that of the prior art.

It is yet another object of the present invention to provide a nondispersive infrared radiation source which is smaller in size and more economical to make than the prior art.

Finally, it is another object of the present invention to provide a nondispersive infrared radiation source which has a more reliable thick film resistor than the prior art.

These and additional objects, advantages, features and benefits of the present invention will become apparent from the following specification.

DETAILED DESCRIPTION OF THE PREFERRED EMBODIMENTS

Figure 1:
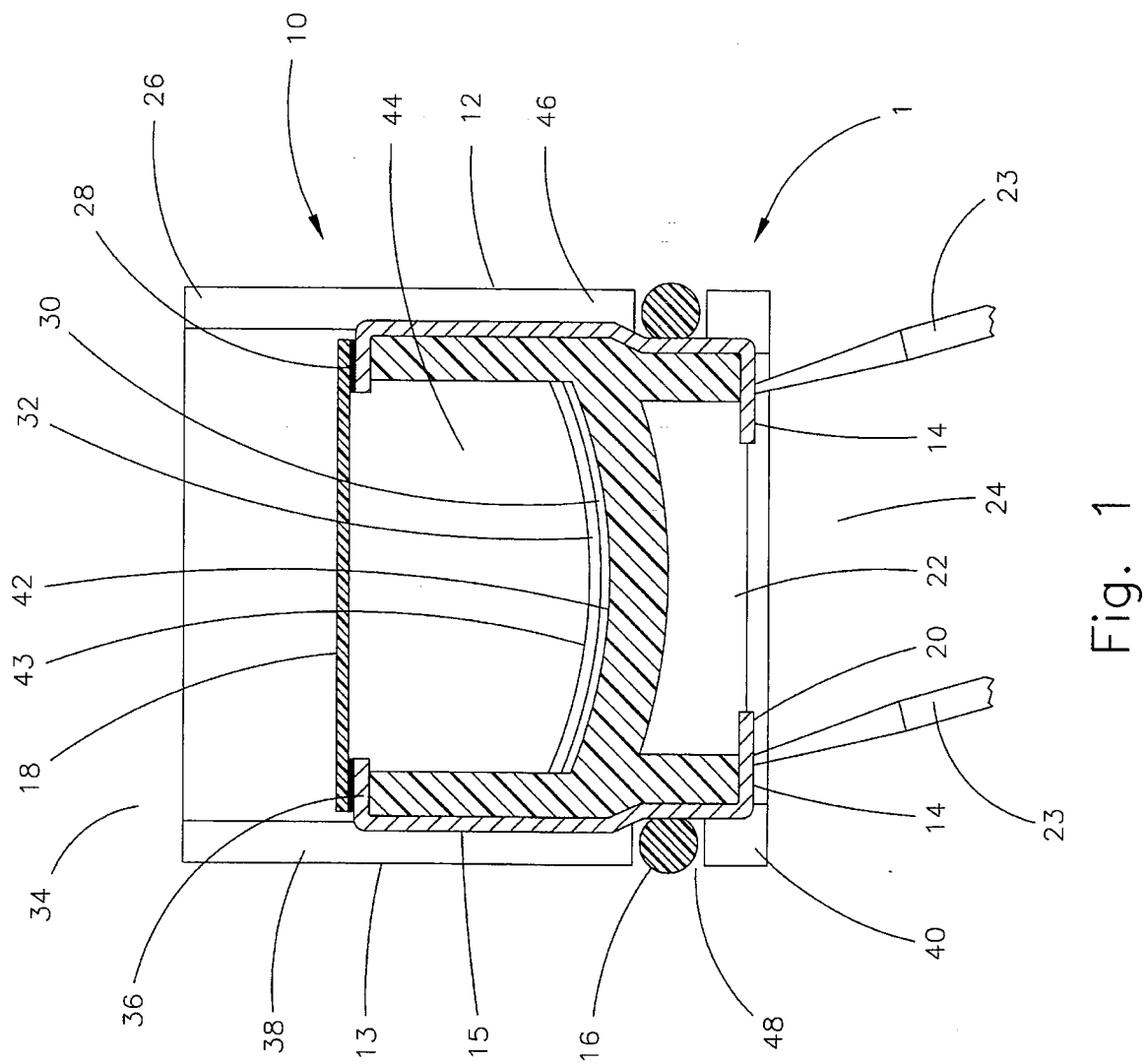
FIG. 1 is a cross sectional detail view of a nondispersive infrared radiation source in accordance with the present invention.
Figure 6:
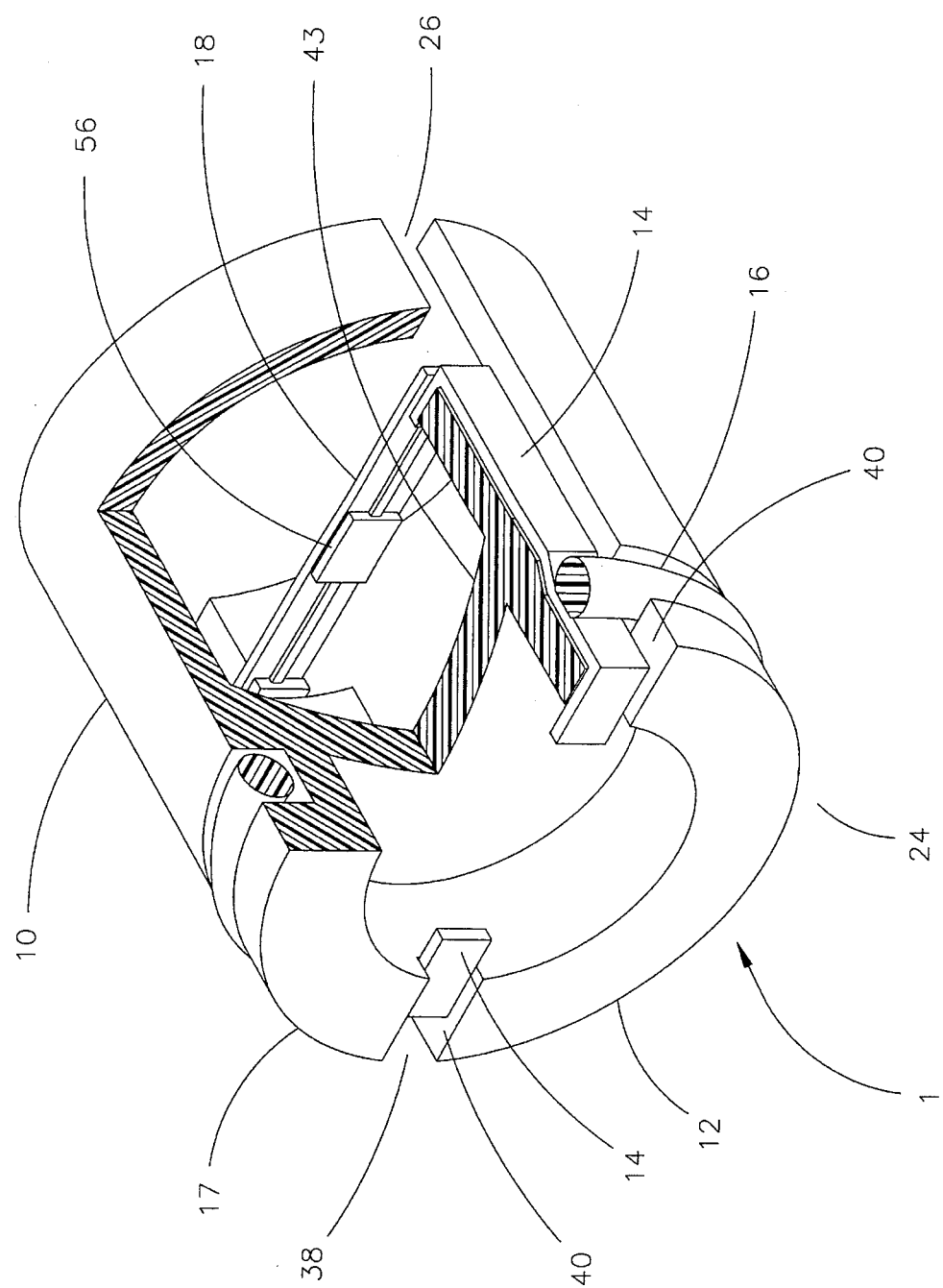
FIG. 6 is a partly sectional perspective detail view of an assembled nondispersive infrared radiation source in accordance with the present invention.

With reference now to the drawings, and particularly to FIG. 1, there is shown a cross sectional detail view of a nondispersive infrared radiation source 1 in accordance with the present invention. A perspective detail view of the infrared radiation source 1 is shown in FIG. 6. With reference to FIGS. 1 and 6, the nondispersive infrared radiation source 1 comprises a base 10, a plurality of formed pins 14, an o-ring 16 and a thick film resistor 18. The base 10 has an outside shape of a cylinder 12 with a first end 24, a second end 34, and a predetermined length 13.

A first pin groove 38 and a second pin groove 46 are formed in the length of the base 10. A first pin slot 40 is formed at the first end 24 of the base 10 and a second pin slot 26 is formed at the second end 34 of the cylinder 12. First pin slot 40 and second pin slot 26 provide clearance for each formed pin to be inserted into first groove 38 or second pin groove 46.

An o-ring groove 48 is formed in the circumference 17 of the cylinder at substantially the first end 24. A bore 44 is formed at substantially the second end of the base 10 being terminated by a bottom surface 42 having a spherical radius. The bottom surface 42 is disposed in substantially the middle of the predetermined length 13 of the base 10.

Preferred dimensions are given for the following elements as example and not by way of limitation. A titanium-tungsten alloy coating 30 having a thickness of approximately 50 angstroms is applied to the bottom surface 42 of the bore 44 utilizing an evaporative process or an electron beam deposition process. A layer of aluminum coating 32 with a thickness of between 500–800 angstroms is then applied with an evaporative process upon the titanium-tungsten alloy coating. The deposition of titanium-tungsten alloy coating 30 and aluminum coating 32 provide a reflective surface 43 by which infrared light may be reflected therefrom. A shallow bore 22 is formed in substantially the first end of the cylinder 12 to reduce the amount of plastic in the base 10. Satisfactory parts have been made when the base 10 is fabricated from ULTEM brand plastic made by General Electric Plastics of Schenectady, N.Y.

Each formed pin 14 has a first end 20, a second end 36 and a predetermined length 15. The predetermined length 15 of each formed pin is heat staked into first pin groove 38 and second pin groove 46 in the base 10. The o-ring 16 is rolled over the first end 24 of the base 10 into the o-ring groove 48 thereof. The o-ring 16 helps retain the plurality of formed pins in contact with the base 10.

Figure 2:
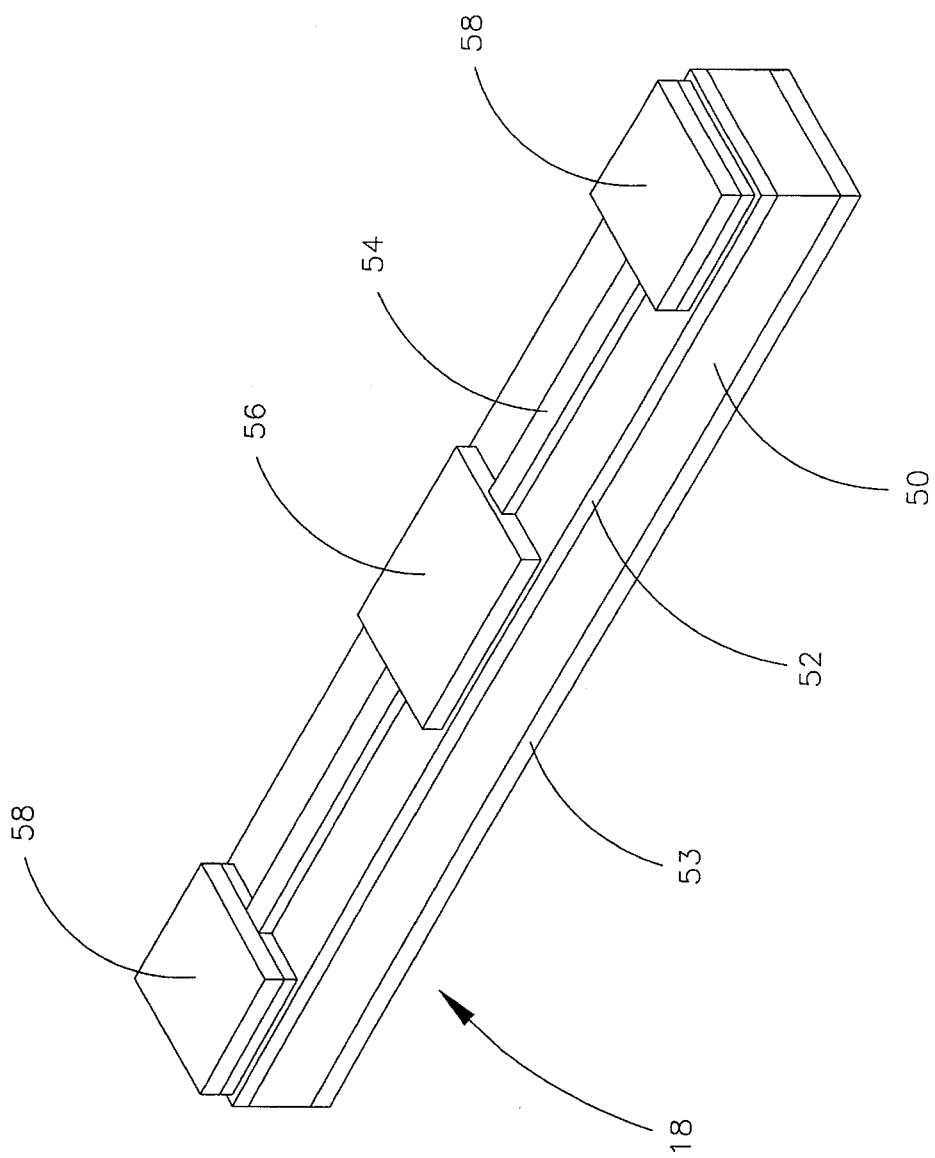
FIG. 2 is a perspective detail view of a thick film resistor in accordance with the present invention.

FIG. 2 shows a perspective detail view of a thick film resistor 18. The thick film resistor 18 includes a substrate 50, a dielectric glass layer 52, a conductor layer 54, a resistive pad 56, a platinum coating 53 and a plurality of solder pads 58.

Preferred dimensions are given for the following elements as example and not by way of limitation. The substrate 50 can be fabricated from a plate of either steatite or barium titanate which is between 0.0025–0.0040 inches thick. Each thick film resistor 18 has a surface dimension of approximately 0.022 inches wide×0.160 inches long.

A thick film layer of the dielectric glass layer 52 having a thickness of approximately 10 microns is applied to the substrate 50. A conductor layer 54 which is approximately 10 microns thick and 0.004 inches wide is thick film applied to the dielectric glass layer 52. Each end of the conductor layer 54 has a square shape of approximately 0.02 inches× 0.02 inches to accommodate the deposition of a palladium-silver solder pad 58 having a thickness of approximately 15 microns. A resistive pad 56 is applied upon the conductor layer 54 in substantially the center of the thick film resistor 18. The resistive pad 56, the conductor layer 54 and the plurality of solder pads 58 are all electrically conductive to each other.

A platinum coating 53 is applied through any standard process upon the substrate 50 on the side opposite the dielectric glass layer 52; the platinum coating 53 is between 200–800 angstroms thick. The platinum coating 53 prevents infrared light generated by resistive pad 56 from penetrating through the substrate 50.

The purpose of the dielectric glass layer 52 is to act as a heat isolator between the conductor layer 52 and the substrate 50 The thin width of the conductor layer 54 also acts to isolate heat generated in the resistive pad 56 from being heat sunk by the plurality of formed pins 14. Less electrical current is required because less heat is lost from the resistive pad 56.

Figure 3:
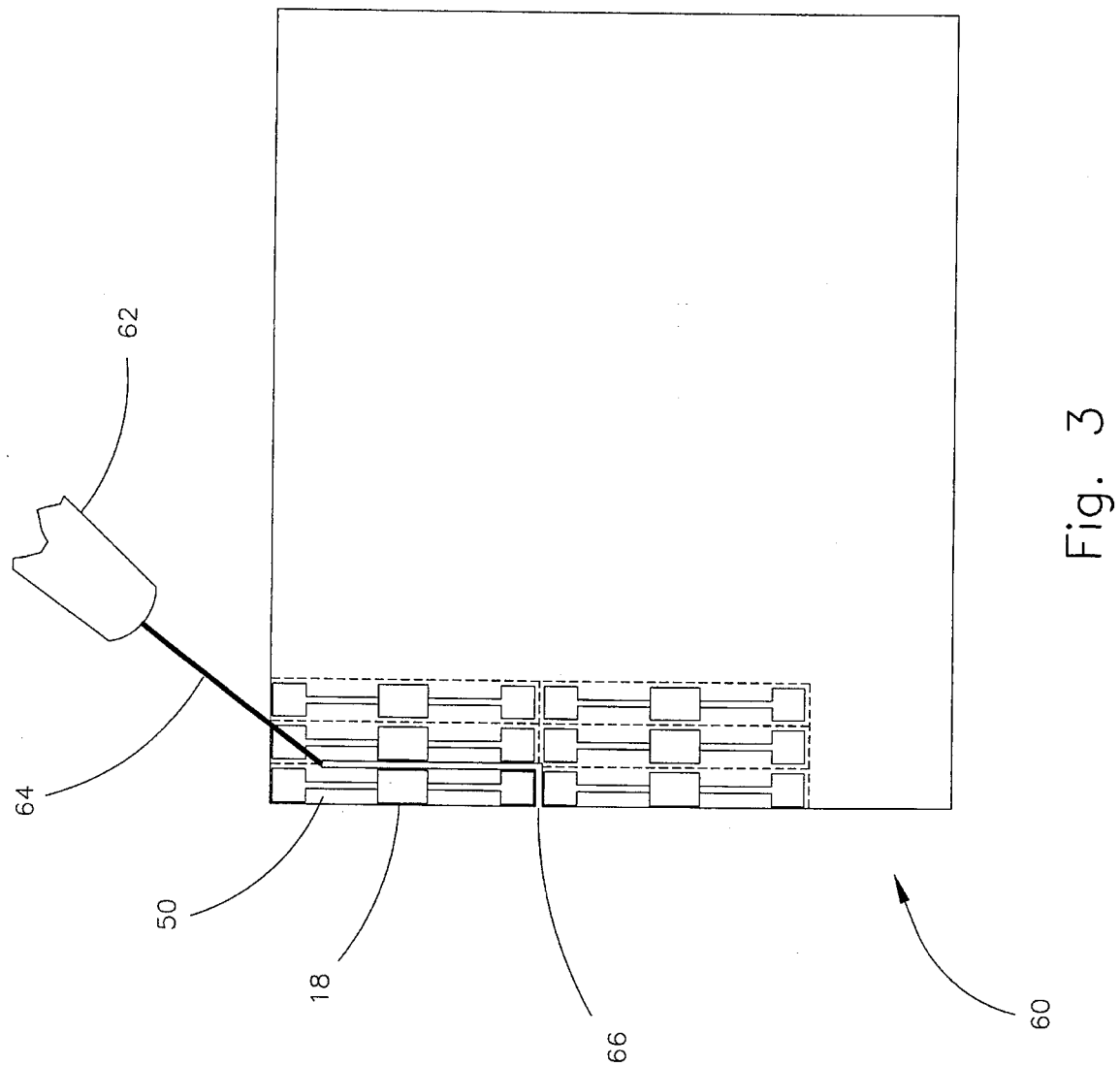
FIG. 3 is a perspective view of a thick film resistor being cut from a substrate with a quadrapole laser in accordance with the present invention.

FIG. 3 is a perspective view of a thick film resistor 18 being cut from a substrate plate 60 with a quadrapole laser 62. A plurality of thick film resistors 18 are normally formed in a large quantity on a substrate plate 60. The plurality of thick film resistors 18 are separated from the substrate plate 60 with a laser beam 64 emitting from the quadrapole laser 62. The laser beam 64 is moved along the perimeter of each thick film resistor and vaporizes a small area of substrate plate 66 which separates each thick film resistor 18 from each other. The perimeter of each thick film resistor 18 has an edge that looks as if it had been polished.

Figure 4:
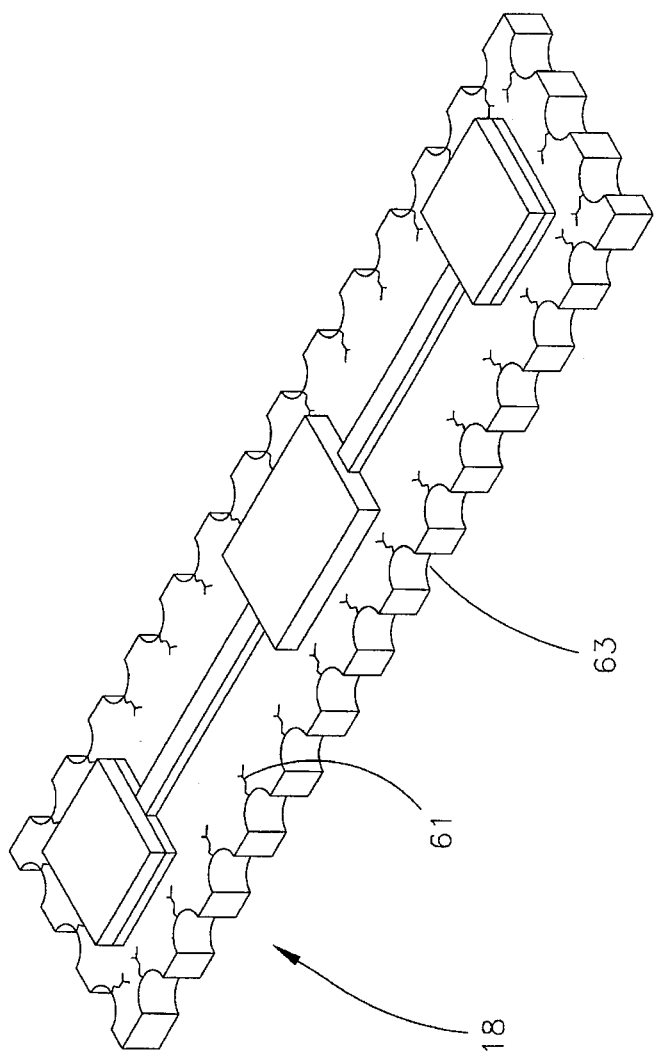
FIG. 4 is a perspective detail view of a thick film resistor that has been cut using a laser drilling method as used in the prior art.

With contrasting reference to the prior art as depicted in FIG. 4, the milling-like action of the quadrapole laser 62 according to the present invention is a great improvement over the prior art perforated edge 63 generated when the thick film resistor 18 is separated with a laser drilling operation. The perforated edge 63 develops micro cracks 61 which can result in premature catastrophic failure of the thick film resistor 18.

With reference to FIG. 1, the soldering process is performed by the application of solder paste 28 to the plurality of solder pads 58 of the thick film resistor 18 and the second end 36 of the plurality of formed pins 14. The thick film resistor 18 and the plurality of formed pins 14 are physically held together while a tip of a heated soldering iron touches the first end 20 of each formed pin 14. The heat applied to each formed pin 14 is conducted by the second end 36 of each formed pin 14 and melts the solder paste 28 to form an electrical and mechanical bond between the thick film resistor 18 and each formed pin 14.

Figure 5:
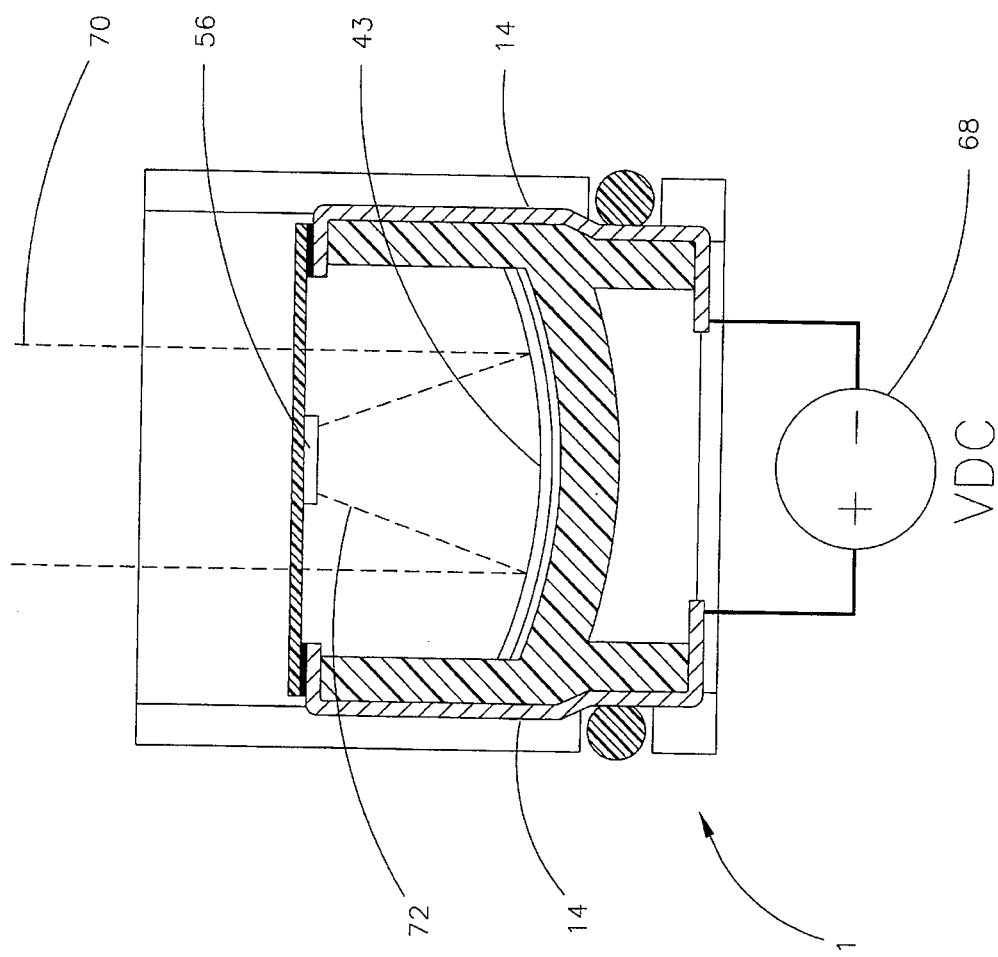
FIG. 5 is a cross sectional detail view of a nondispersive infrared radiation source having a DC voltage source applied to the plurality of formed pins which generates a reflected infrared light source in accordance with the present invention.

FIG. 5 shows a cross sectional detail view of a nondispersive infrared radiation source 1 having a DC voltage source applied to the plurality of formed pins 14. The application of voltage to the plurality of formed pins 14 causes resistive pad 56 to emit infrared light 72 which is reflected off the reflector 43. The reflected infrared light 70 may now be used in gas analysis equipment.

FIG. 6 is a partly sectional perspective detail view of an assembled nondispersive infrared radiation source 1 which includes the base 10, the thick film resistor 18, plurality of formed pins 14, reflective surface 43, the resistive pad 56, and o-ring 16. The first pin slot 40, second pin slot 26 and first pin groove 38 are also shown. The base 10 has an outside shape of a cylinder 12.

Figure 7:
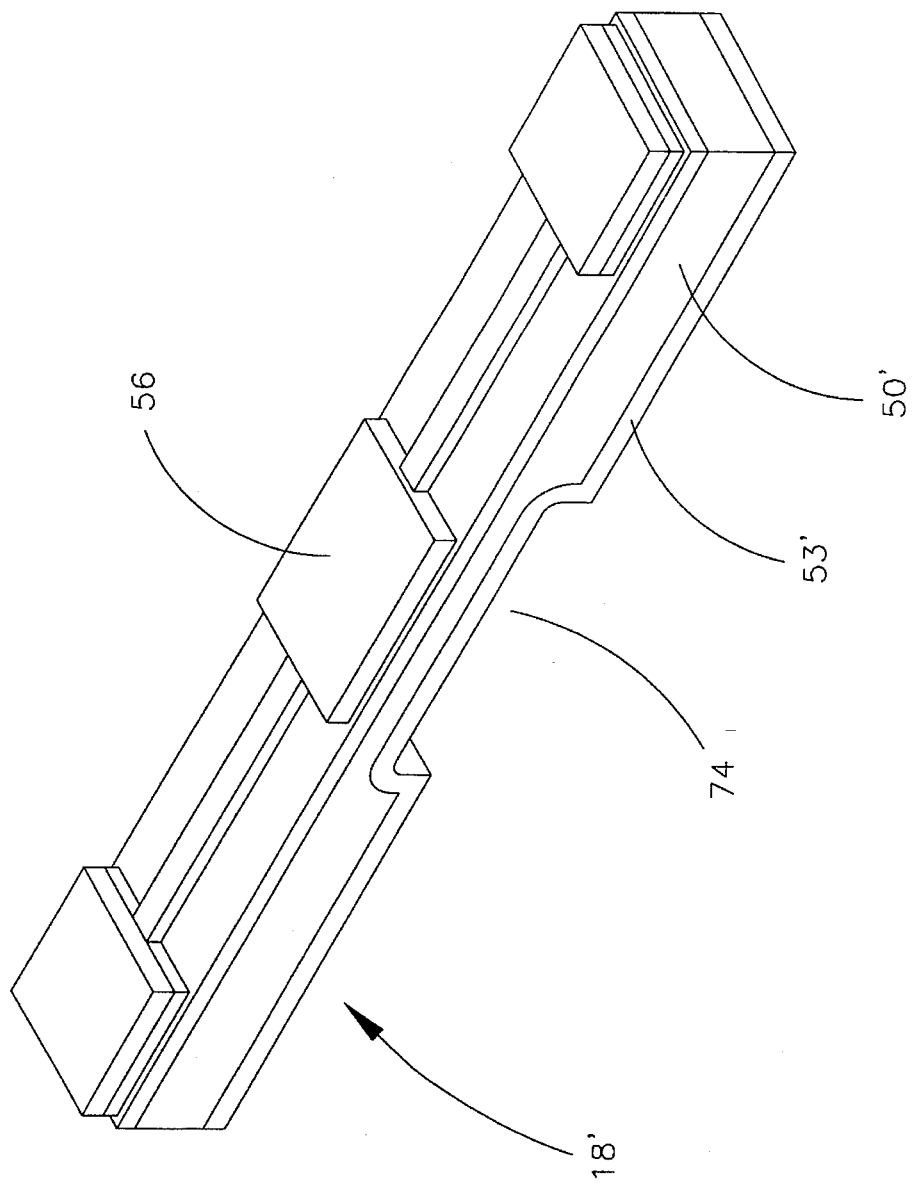
FIG. 7 is a perspective detail view of the alternative preferred embodiment of a thick film resistor with a cutout in the substrate.

FIG. 7 is a perspective detail view of the alternative preferred embodiment of a thick film resistor 18' with a cutout 74 in a substrate 50'. The cutout 74 is made in the substrate 50' to reduce the transfer of heat from the resistive pad 56. The cutout 74 can be implemented with any suitable laser cutting process. A platinum coating 53' is applied through any standard process upon the substrate 50' on the side opposite the dielectric glass layer 52. The platinum coating 53' is also applied upon the cutout 74. The platinum coating 53' is between 200–800 angstroms thick. The platinum coating 53' prevents infrared light generated by resistive pad 56 from penetrating through the substrate 50'.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A nondispersive infrared radiation source comprising:

a base having a first end, a second end, a circumference and a predetermined length;

said base further having, a bore formed in said base at substantially said second end;

a plurality of formed pins, each said formed pin having a first end, a second end and a predetermined length;

an o-ring being sized to be received by an o-ring groove formed in said circumference at said first end of said base;

a thick film resistor electrically connected to said second end of each of said formed pins; and a reflective surface which terminates said bore of said base.

2. The nondispersive infrared radiation source of claim 1 further comprising:

a DC voltage source, said first end of each of said formed pins being electrically connected to said DC voltage source;

said reflective surface being disposed in substantially the middle of said predetermined length of said base; and a resistive pad electrically connected to said thick film resistor, said resistive pad facing said reflective surface of said base, wherein said resistive pad radiates an infrared light when connected to said DC voltage source, said infrared light striking said reflective surface and said infrared light emitting from said second end of said base.

3. The nondispersive infrared radiation source of claim 1 wherein:

said base being defined by a cylindrical shape, a first pin groove and a second pin groove are formed in said predetermined length of said base, a first pin slot formed at said first end of said base and a second pin slot formed at said second end of said base, wherein said first and second pin slots and said first and second pin grooves provide clearance for the insertion of each said formed pin into said base, plurality of said formed pins being heat staked to said base.

4. The nondispersive infrared radiation source of claim 1 further comprising:

said thick film resistor having a substrate selected from one of steatite and barium titanate;

a dielectric glass layer being thick film applied upon said substrate;

a conductor layer applied upon said dielectric glass layer;

a plurality of solder pads being thick film applied upon said conductor layer, each said solder pad comprising palladium-silver;

said resistive pad being thick film applied upon said conductor layer;

a platinum coating being applied upon said substrate on the side opposing said dielectric glass layer;

wherein said dielectric glass layer provides thermal isolation between said substrate and said resistive pad; and wherein said resistive pad, said conductor layer and said plurality of solder pads are electrically conductive to each other.

5. The nondispersive infrared radiation source of claim 4 further comprising:

a cutout formed in said substrate of said thick film resistor, said platinum coating applied upon said cutout, wherein material is removed from under said resistive pad to reduce the amount of heat transfer from said resistive pad to said substrate.

6. The nondispersive infrared radiation source of claim 1 further comprising:

said bore of said base having a bottom surface being defined by a spherical radius;

a titanium-tungsten coating applied by one of an evaporative process or electron beam deposition process on said bottom surface of said bore; and an aluminum coating being applied with an evaporative process upon said titanium-tungsten coating to form said reflective surface in said base.

7. A nondispersive infrared radiation source comprising:

a base having a first end, a second end, a circumference and a predetermined length;

said base further having, a bore formed in said base at substantially said second end;

a plurality of formed pins, each said formed pin having a first end, a second end and a predetermined length;

a thick film resistor electrically connected to said second end of each of said formed pins;

a reflective surface which terminates said bore of said base, said reflective surface being disposed in substantially the middle of said predetermined length of said base;

an o-ring being sized to be received by an o-ring groove formed in said circumference at said first end of said base;

a DC voltage source, said first end of each of said formed pins being electrically connected to said DC voltage source; and a resistive pad electrically connected to a conductor layer, said resistive pad facing said reflective surface of said base, wherein said resistive pad radiates an infrared light when connected to said DC voltage source, said infrared light striking said reflective surface and said infrared light emitting from said second end of said base.

8. The nondispersive infrared radiation source of claim 7 wherein:

said base being defined by a cylindrical shape, a first pin groove and a second pin groove are formed in said predetermined length of said base, a first pin slot formed at said first end of said base and a second pin slot formed at said second end of said base, wherein said first and second pin slots and said first and second pin grooves provide clearance for the insertion of each said formed pin into said base, plurality of said formed pins being heat staked to said base.

9. The nondispersive infrared radiation source of claim 7 further comprising:

said thick film resistor having a substrate selected from one of steatite and barium titanate;

a dielectric glass layer being thick film applied upon said substrate;

said conductor layer applied upon said dielectric glass layer;

a plurality of solder pads being thick film applied upon said conductor layer, each said solder pad comprising palladium-silver;

said resistive pad being thick film applied upon said conductor layer;

a platinum coating being applied upon said substrate on the side opposing said dielectric glass layer;

wherein said dielectric glass layer provides thermal isolation between said substrate and said resistive pad; and wherein said resistive pad, said conductor layer and said plurality of solder pads are electrically conductive to each other.

10. The nondispersive infrared radiation source of claim 9 further comprising:

a cutout formed in said substrate of said thick film resistor, said platinum coating applied upon said cutout, wherein material is removed from under said resistive pad to reduce the amount of heat transfer from said resistive pad to said substrate.

11. The nondispersive infrared radiation source of claim 7 further comprising:

said bore of said base having a bottom surface being defined by a spherical radius;

a titanium-tungsten coating applied by one of an evaporative process or electron beam deposition process on said bottom surface of said bore; and an aluminum coating being applied with an evaporative process upon said titanium-tungsten coating to form said reflective surface in said base.

12. A thick film resistor suitable for use in a nondispersive infrared radiation source comprising:

a substrate selected from one of steatite and barium titanate;

a dielectric glass layer being thick film applied upon said substrate;

a conductor layer applied upon said dielectric glass layer;

a plurality of solder pads being thick film applied upon said conductor layer, each said solder pad comprising palladium-silver;

said resistive pad being thick film applied upon said conductor layer;

a platinum coating being applied upon said substrate on the side opposing said dielectric glass layer;

wherein said dielectric glass layer provides thermal isolation between said substrate and said resistive pad; and wherein said resistive pad, said conductor layer and said plurality of solder pads are electrically conductive to each other.

13. The thick film resistor suitable for use in a nondispersive infrared radiation source of claim 12, further comprising:

a cutout formed in said substrate of said thick film resistor, said platinum coating applied upon said cutout, wherein material is removed from under said resistive pad to reduce the amount of heat transfer from said resistive pad to said substrate.

14. The thick film resistor suitable for use in a nondispersive infrared radiation source of claim 13 wherein:

said thick film resistor being separated from said substrate plate utilizing a quadrapole laser beam.

15. A thick film resistor suitable for use in a nondispersive infrared radiation source comprising:

a substrate selected from one of steatite and barium titanate;

a dielectric glass layer being thick film applied upon said substrate;

a conductor layer applied upon said dielectric glass layer;

a plurality of solder pads being thick film applied upon said conductor layer, each said solder pad comprising palladium-silver;

said resistive pad being thick film applied upon said conductor layer;

wherein said dielectric glass layer provides thermal isolation between said substrate and said resistive pad; and wherein said resistive pad, said conductor layer and said plurality of solder pads are electrically conductive to each other.

16. The thick film resistor suitable for use in a nondispersive infrared radiation source of claim 15, further comprising:

a cutout formed in said substrate of said thick film resistor, a platinum coating applied upon said cutout, wherein material is removed from under said resistive pad to reduce the amount of heat transfer from said resistive pad to said substrate.

17. The thick film resistor suitable for use in a nondispersive infrared radiation source of claim 16, wherein:

said platinum coating being applied upon said substrate on the side opposing said dielectric glass layer.

18. The thick film resistor suitable for use in a nondispersive infrared radiation source of claim 17 wherein:

said thick film resistor being separated from said substrate plate utilizing a quadrapole laser beam.

* * * * *